US011789989B1

(12) United States Patent
Liu et al.

(10) Patent No.: US 11,789,989 B1
(45) Date of Patent: Oct. 17, 2023

(54) AUTOMATICALLY DETECTING UNACCEPTABLE CONTENT PAIRS

(71) Applicant: Amazon Technologies, Inc., Seattle, WA (US)

(72) Inventors: Tianyi Liu, San Francisco, CA (US); Lena Evans, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 290 days.

(21) Appl. No.: 17/364,825

(22) Filed: Jun. 30, 2021

(51) Int. Cl.
| G06F 17/00 | (2019.01) |
| G06F 16/33 | (2019.01) |
| G06N 20/00 | (2019.01) |
| A63F 13/87 | (2014.01) |
| G06N 5/04  | (2023.01) |
| A63F 13/70 | (2014.01) |
| A63F 13/86 | (2014.01) |

(52) U.S. Cl.
CPC .......... *G06F 16/3334* (2019.01); *A63F 13/70* (2014.09); *A63F 13/86* (2014.09); *A63F 13/87* (2014.09); *G06N 5/04* (2013.01); *G06N 20/00* (2019.01); *A63F 2300/572* (2013.01)

(58) Field of Classification Search
CPC ...... G06F 16/3334; A63F 13/70; A63F 13/86; A63F 13/87; A63F 2300/572; G06N 5/04; G06N 20/00
See application file for complete search history.

(56) References Cited

U.S. PATENT DOCUMENTS

| 7,752,274 | B2  | 7/2010  | Pagan |
| 7,801,738 | B2  | 9/2010  | Agarwal et al. |
| 8,074,162 | B1  | 12/2011 | Cohen |
| 8,868,408 | B2  | 10/2014 | Spears |
| 9,405,741 | B1  | 8/2016  | Schaaf et al. |
| 9,699,299 | B1* | 7/2017  | Pereira ............. H04M 1/72436 |
| 10,250,538 | B2 | 4/2019  | Prabhu |
| 10,482,163 | B2*| 11/2019 | Hullette ................. H04L 51/04 |
| 10,534,827 | B2 | 1/2020  | Spears |
| 10,558,757 | B2*| 2/2020  | Fan ......................... G06F 40/30 |

(Continued)

OTHER PUBLICATIONS

Koji Nakahira et al., An Analysis of Influence of Emoticons on Affective Impressions Feeling from Tweets. In Proceedings of the 21st International Con. on Info. Integration and Web-based Applications; Services. Association for Computing Machinery, 185-192, <https://doi.org/10.1145/3366030> Dec. (Year: 2019).*

(Continued)

*Primary Examiner* — Greta L Robinson
(74) *Attorney, Agent, or Firm* — S. Scott Foster; Kowert, Hood, Munyon, Rankin & Goetzel, P.C.

(57) ABSTRACT

An emote management system receives a request to make an emote available for users of an application for inclusion in a real-time content stream provided by the application, wherein the emote includes a proposed content pair comprising an image and a text string. The emote management system determines, based on application of a machine learning model to the content pair, whether the proposed content pair satisfies a content pair acceptability threshold. Based a determination that the proposed content pair satisfies the content pair acceptability threshold, return a response to the client indicating that the proposed content pair is an accepted content pair.

20 Claims, 12 Drawing Sheets

(56) References Cited

U.S. PATENT DOCUMENTS

| | | | |
|---|---|---|---|
| 10,635,750 B1 | 4/2020 | Epstein et al. | |
| 11,044,218 B1* | 6/2021 | Eng | H04L 51/10 |
| 11,115,356 B2* | 9/2021 | Rai | H04L 51/10 |
| 2005/0163379 A1* | 7/2005 | Zimmermann | G06Q 10/107 |
| | | | 704/E15.045 |
| 2015/0070516 A1 | 3/2015 | Shoemake et al. | |
| 2016/0275343 A1 | 9/2016 | Dinerstein et al. | |
| 2018/0295072 A1* | 10/2018 | Yim | G06F 3/04817 |
| 2019/0197477 A1 | 6/2019 | Muller et al. | |
| 2020/0219295 A1* | 7/2020 | el Kaliouby | G06T 11/00 |

OTHER PUBLICATIONS

Brian Hu Zhang, et al., "Mitigating Unwanted Biases with Adversarial Learning", arX1v:1801.07593v1, Jan. 22, 2018, pp. 1-7.

Gregor Wiedemann, et al., "Transfer Learning from LDA to BiLSTM-CNN for Offensive Language Detection in Twitter", arXiv:1811.02906v1, Nov. 7, 2018, pp. 1-10.

* cited by examiner

Account identifiers/usernames 610

String code identifiers for icons (e.g., emotes) 612

URL shorteners 614

Domain names 616

Hashtags 618

File names 620

Identify/select acceptable content pairs and unacceptable content pairs to be included in a training data set for an unacceptable content pair detection model for a network-accessible service or application at which approved content pairs usable by users of the network-accessible service or application; the content pairs including an image and a text string 902

Train a neural network-based machine learning model using the training data set to generate acceptability scores for new content pairs (i.e., content pairs not in the training data set); the model may include depth layers, an unacceptable image model and an unacceptable text model 904

Store a trained version of the machine learning model 906

Update training data sets periodically, retrain the model, and at least a selected subset or sample of the existing approved content pairs may be re-scored using the retrained version of the model to determine whether some content pairs have to be rejected 908

FIG. 9

AUTOMATICALLY DETECTING UNACCEPTABLE CONTENT PAIRS

BACKGROUND

Media distribution services provide various forms of content delivery mechanisms, such as video or audio streaming to remote viewers. The viewers may receive the content over a streaming service that transmits media content via a network connection such as the Internet. The streaming service can provide numerous content streams from different broadcasters. The streaming service can allow interactivity between the broadcasters and the viewers through different types of communication channels or types of communication. Viewers can provide text-based interactions by entering text into a chat window.

Services can also accept additional user-generated content that can be invoked by viewers and broadcasters during a content stream. The streaming service can have agents that manually review each of the content items that have been provided in order to determine whether the content items meet community standards. Content items that violate community standards may be rejected by the agents and not available to users during content streams. However, the manual process of reviewing the user-generated content is time consuming and can create a backlog of incoming content items when users upload content items at a rate that exceeds review time by the agents.

BRIEF DESCRIPTION OF THE DRAWINGS

FIG. 6 illustrates examples of the types of entity identifiers for which unacceptable content analysis may be performed, according to at least some embodiments.

FIG. 9 illustrates a flowchart diagram for a method for training a neural network-based machine learning model for detecting unacceptable content pairs, such as for emotes in a network-accessible service, according to some embodiments.

Figure 1:
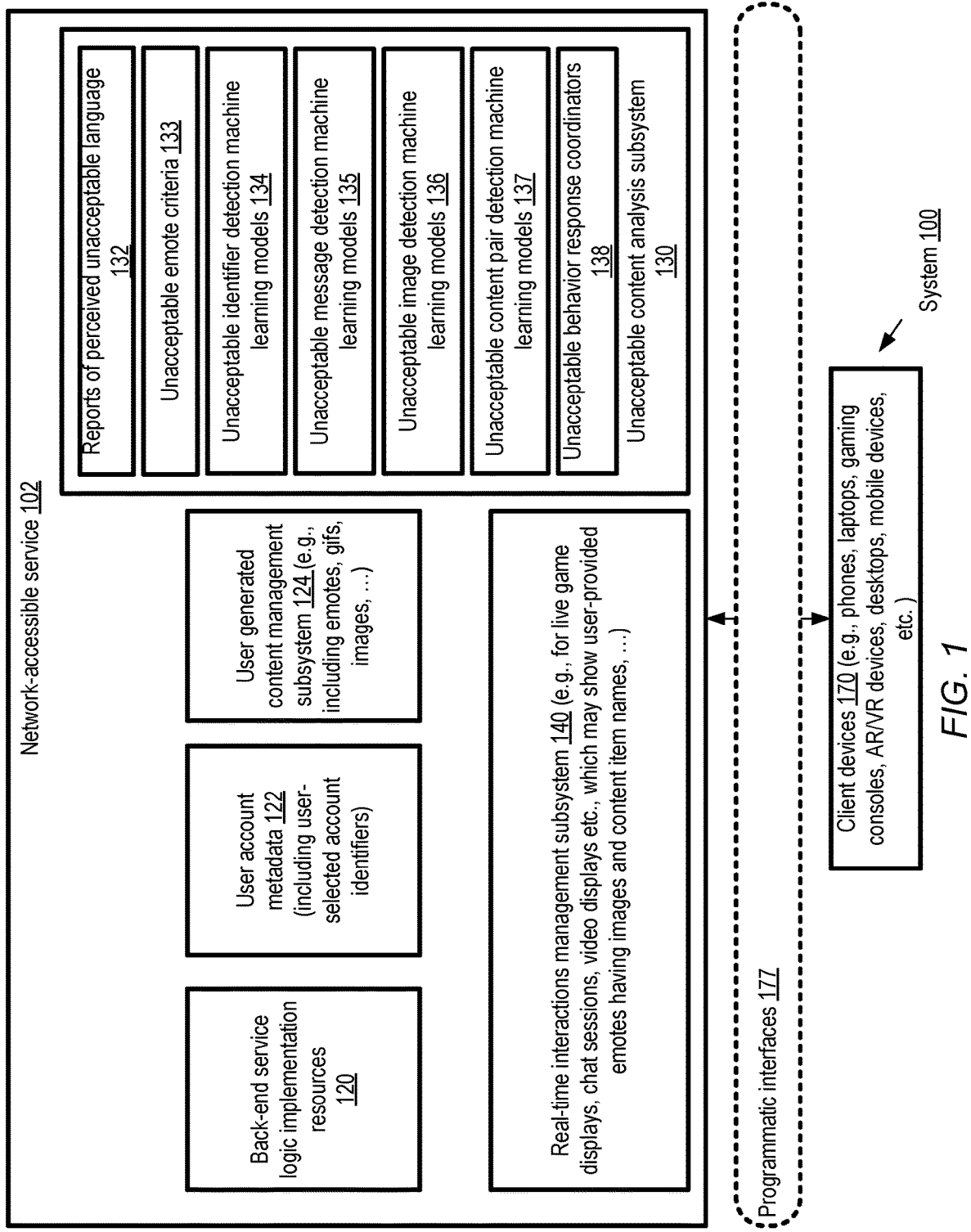
FIG. 1 illustrates a system environment in which proposed emotes are evaluated for offensiveness according to a machine learning model, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Various embodiments of systems and processes for managing content submissions from users of a service are disclosed herein. A service provider network may provide various services for clients. One of the services of the various services may include a media streaming service, such as a video game streaming service or a communications service, such as a chat service. Thus, the clients may include broadcasters that provide media content and viewers who view and consume the media content via a streaming interface. In some embodiments, the video game streaming service and the chat service may be integrated to allow broadcasters and viewers to chat alongside a stream of a video game, thereby increasing interactivity between the broadcasters and the viewers. For example, the chat service may be a subsystem of the video game streaming service.

The chat service may include additional images that can be embedded within a text entry into the chat window. The additional images may also be referred to as emotes. The emotes may use an image to convey a message in a graphical format. For example, a smiling face may indicate that the user is happy, and a speedometer may convey that the user is going fast or instructing another user to go faster. The emotes may be invoked by a client based on the client executing an application having an interface to select the emote from a list of emotes. The emotes may also be invoked by the client based on the client entering a text string that acts as a text code to call on the emote. For example, the client may use a human interface device (e.g., a keyboard, a mouse, etc.) to select the emote from a list of emotes that includes the images or the text codes for the emotes. As another example, the client may enter the text code in order to add the emote to the current chat window.

Initially, the chat service may include a default set of emotes that are usable by the clients. A client, such as a broadcaster, may request that an emote be added to the chat service to be used in subsequent chat sessions, such as within a future broadcast by the broadcaster. In order to add the emote to the chat service for use in a future broadcast, the broadcaster may submit a content pair that includes the image and the text string for the emote to an emote management system for the chat service.

The emote management system, the chat service, the video game streaming service, or the provider network may enforce community standards with respect to broadcasts, emotes, images or text that is presented via the various services. The community standards may be codified as a terms of service agreement between the clients and the service. The community standards may include restrictions on obscenity, profanity, inappropriate content, or otherwise unacceptable content such that broadcasts, emotes, images or text that violate the community standards may be blocked, removed, or rejected from the various services. The community standards may be enforced as part of terms of service for usage of the various services. A submitted emote may be subject to the community standards and be analyzed to determine if the emote is acceptable under the community standards.

The services may include the emote management system, such as an unacceptable content analysis subsystem, that is configured to analyze the content pair for the emote and other user generated content according to a neural network-based machine learning model. The machine learning model may be configured to analyze both the image and the text string of the emote to determine whether the emote is acceptable under the community standards or should be rejected. The machine learning model may determine an image acceptability inference for the image of the emote based on determining an offensiveness or acceptability of the image. The machine learning model may determine the offensiveness or acceptability of the image based on training data that indicates various images that are indicated as either offensive or not offensive or alternatively, acceptable or unacceptable. The machine learning model may determine a text acceptability inference for the text string of the emote based on determining an offensiveness or acceptability of the text string. The machine learning model may determine the offensiveness of the text string based on training data that indicates various text strings that are indicated as either offensive or not offensive or alternatively, acceptable or unacceptable.

Offensive images and offensive text strings may be provided as training data to the machine learning models for detecting offensive images and detecting offensive text. In some situations, an image may always be considered to be offensive or unacceptable under the community standards, or a text string may always be considered to be offensive or unacceptable under the community standards. Thus, the image may have an image acceptability inference that indicates the image is offensive or unacceptable, or the text string may have a text acceptability inference that indicates the text string is offensive or unacceptable.

Offensive combinations of images and text strings may be provided as content pair training data to the machine learning model for detecting offensive content pairs. In some situations, an image and a text string may not necessarily be offensive or unacceptable individually but may be considered offensive or unacceptable in combination. For instance, the image and the text string when considered independently may be perfectly acceptable, however, the combination of the text string and image may take on a completely different meaning than that of the individual components. This completely different meaning may be deemed unacceptable.

Based on the image acceptability inference and the text acceptability inference, the offensive content analysis subsystem may determine whether the content pair satisfies a content pair acceptability threshold. The machine learning model may consider the combination of the content pair in order to determine a content pair acceptability score. The machine learning model may determine the content pair acceptability score based at least in part on an analysis of the combination of the image and the text string of the content pair in addition to the image acceptability inference and the text acceptability inference. The content pair acceptability score may be compared with a content pair acceptability threshold that may be a threshold value such that acceptable content pairs satisfy the threshold value while unacceptable content pairs do not satisfy the threshold value. For example, the content pair may represent an offensive content pair when at least one of the image acceptability inference, the text acceptability inference, or the content pair acceptability score does not satisfy the content pair acceptability threshold. As another example, the content pair may represent an acceptable content pair when each of the image acceptability inference, the text acceptability inference, and the content pair acceptability score satisfies the content pair acceptability threshold.

In some embodiments, a system for managing content pair submissions for emotes may include one or more processors and a memory that stores instructions that, when executed on or across the one or more processors, cause the one or more computing devices to implement an emote management system. The emote management system may be configured to receive a request to make an emote available for users of an application for inclusion in a real-time content stream provided by the application, wherein the emote includes a proposed content pair comprising an image and a text string. The emote management system may also be configured to determine, based on application of a machine learning model to the content pair, whether the proposed content pair satisfies a content pair acceptability threshold. The emote management system may further be configured to, based a determination that the proposed content pair satisfies the content pair acceptability threshold, return a response to the client indicating that the proposed content pair is an accepted content pair.

In other embodiments, a method may be performed by one or more computing devices. The method may include receiving a proposed content pair from a client to make the proposed content pair available for users of an application to select for inclusion in real-time content provided by the application, wherein the proposed content pair comprises an image and a text string. The method may also include determining, based on an acceptability inference generated for the content pair from a trained machine learning model, whether the proposed content pair satisfies a content pair acceptability threshold. The method may further include based a determination that the proposed content pair satisfies the content pair acceptability threshold, providing the proposed content pair to users for inclusion in real-time content provided by the application.

In yet other embodiments, one or more computer-readable storage media store instructions that, when executed on or across one or more processors, cause the one or more processors to perform operations. The operations may include in response to receiving a proposed content pair from a client to make the proposed content pair available for users of an application to select for inclusion in real-time content provided by the application, determining, based on an acceptability inference generated for the content pair from a trained machine learning model, whether the proposed content pair satisfies a content pair acceptability threshold. The operations may further include based a determination that the proposed content pair satisfies the content pair acceptability threshold, providing the proposed content pair to users for inclusion in real-time content provided by the application.

FIG. 1 illustrates an example system environment in which proposed emotes are received and evaluated for potential offensiveness or unacceptability at a network-accessible service using a machine learning model which includes a character-level embedding layer and does not perform word-sequence based analysis, according to at least some embodiments. As shown, system 100 comprises resources and artifacts of network-accessible service 102, including for example back-end service logic implementation resources 120, user account metadata 122, user generated content management subsystem 124, real-time interactions management subsystem 140, and an unacceptable content analysis subsystem 130 in the depicted embodiment. Each of these subcomponents of the network-accessible service may be implemented or managed using one or more computing devices in various embodiments. The network-accessible service 102 may support thousands of concurrent users who can interact with one another via a set of programmatic interfaces 177, e.g., to watch a live streaming display of video games being played and provide feedback or input via chat messages which are also displayed live. Service 102 may also be referred to as a multi-user online interaction service. Programmatic interfaces 177 may, for example, include web-based interfaces (such as chat windows, video display windows, image display windows, audio playing web components, multi-user interactive online streaming interfaces etc.), graphical user interfaces and the like. For some types of interactions, such as administrative interactions, the network-accessible service may also support command line tools and/or application programming interfaces (APIs) in various embodiments. Users may interact with the service 102 using programmatic interfaces 177, from a variety of client devices 170 in the depicted embodiment, such as phones, laptops, gaming consoles or players, augmented reality (AR) or virtual reality (VR) devices, desktops, mobile devices such as tablets and the like in at least some embodiments.

The presentation of content accessible from the network-accessible service may be managed by a content display system, such as real-time interactions management subsystem 140, and the presented content may include user-select account identifiers or user identifiers in the depicted embodiment. The business logic of one or more applications implemented at the network-accessible service (e.g., decisions as to exactly which of several views of a game are to be shown next) may be implemented at resources 120. Metadata 122 pertaining to user accounts may in some embodiments include account identifiers, client account names, or user names selected by users, icons or images to be displayed along with the user names, the real names of the users, telephone numbers, age and other demographic information provided by the users at the time of signing up for the service, categories into which individual users have been placed based on their respective engagement levels or duration of active interactions with the service, emotes submitted by the users, and so on. The network-accessible service 102 may store user-generated content at subsystem 124, including for example, emotes (custom images selected by users to express emotions or messages, with associated text strings, labels or codes also selected by users), emoticons, user-generated gifs, videos or audios to be shared with other users, etc. in the depicted embodiment.

The unacceptable content analysis subsystem 130 (also referred to as an emote management system) may be used to detect potentially unacceptable or offensive content (at least from the perspective of some subsets of users of the service) associated with the network-accessible service 102 in the depicted embodiment. The service 102 may enable users to submit reports of perceived unacceptable language 132, including unacceptable user identifiers, user-generated content identifiers, emote codes (e.g., text strings used to identify and invoke emotes), and the like in various embodiments. Such reports may also be referred to as offense reports or complaints. Based at least in part on such reports and/or other reports of unacceptable user behavior, some number of user-submitted identifiers or emotes may be rejected or suspended in the depicted embodiment.

One or more unacceptable behavior response coordinators 138 may be responsible for orchestrating the training and execution of a set of machine learning models to be used to detect unacceptable content in the depicted embodiment. At least one machine learning model may be used specifically to detect unacceptable content pairs representing emotes, while one or more other models may be used to detect unacceptable message contents (e.g., contents of chat messages, where each message may include multiple words) as a separate exercise in the example scenario depicted in FIG. 1. In effect, an unacceptable identifier detection machine learning model 134 may analyze the content of individual identifiers, working at the character level and/or using phonetic representations, while an unacceptable message detection machine learning model 135 may analyze the sequences of words that make up messages, working at the word or token level.

At least one machine learning model may be used to detect unacceptable images used in conjunction with the network-accessible service 102. For example, an unacceptable image detection machine learning model 136 may analyze the content of individual images, such as images used as part of a content pair that indicates an emote. The unacceptable image detection machine learning model 136 may also analyze the content of images submitted by users as part of a chat service, such as embedded images that are used in-line with other chat messages sent by the users of the network-accessible service 102. In some embodiments, the unacceptable image detection machine learning model 136 may analyze the images in addition to the unacceptable message detection machine learning model 135 analyzing the messages as used in the network-accessible service 102. For example, a combination of the images and the messages may result in an unacceptable communication when the images or the messages are acceptable or not offensive on an individual basis.

In at least some embodiments, a database of submitted entity identifiers (e.g., user identifiers, account identifiers, user-generated content identifiers, and the like) may be maintained at the network-accessible service 102, e.g., as part of the user account metadata 122 and/or the user generated content management subsystem 124. This database may include candidate entity identifiers that were accepted upon submission and have been displayed to service users, as well as entity identifiers which were rejected or suspended, e.g., as a result of complaints from other users, and/or based on a set of unacceptable terminology criteria of the service 102. An unacceptable terminology criterion may, for example, indicate that if complaints from at least N distinct trusted users of the service 102 are received independently with respect to a given entity identifier, that identifier should be declared unacceptable. From such a collection of identity identifiers, an acceptable identifier subset and an unacceptable identifier subset may be selected to form an identifier training data set for an unacceptable identifier detection machine learning model 134, e.g., by unacceptable behavior response coordinators 138 in the depicted embodiment. Individual entity identifiers may comprise respective strings of characters which do not include word delimiters such as white space in at least some embodiments.

In some embodiments, a database of submitted content pairs (e.g., images and emote codes or text strings for emotes) may be maintained at the network-accessible service 102, e.g., the user generated content management subsystem 124. The database of submitted content pairs may include images that were submitted for emotes in addition to the text strings representing the emote codes to invoke the emotes. The database of submitted content pairs may also include emotes that have been rejected, removed or subject to additional review, such as emotes removed in response to user reports and/or based on a set of unacceptable emote criteria 133 of the service 102. In some implementations, the unacceptable emote criteria 133 may include classifications of content of images, text strings or a combination that is deemed to be unacceptable for use on the network-accessible service 102. For example, the unacceptable emote criteria 133 may include vulgarity, harassment, drugs or drug paraphernalia, violence or gore, hate speech, or other inappropriate content. In some examples, the unacceptable emote criteria 133 may include other classifications that are not necessarily offensive but may otherwise result in rejection or removal of an emote from the service 102. For example, the unacceptable emote criteria 133 may include single character strings, political imagery, personally identifying information, or other content that may be restricted but not otherwise offensive.

The database of submitted content pairs may be organized into an acceptable content pair subset and an unacceptable content pair subset. The acceptable content pair subset and the unacceptable content pair subset may selected to form a content pair training data set for an unacceptable content pair detection machine learning model 137, e.g., by behavior response coordinators 138.

The unacceptable emote criteria 133 may indicate that a given emote is considered unacceptable based on an unacceptability of the image or an unacceptability of the emote code, in some embodiments. In some embodiments, the unacceptable emote criteria 133 may be established as part of a terms of service agreement between the service 102 and the clients to limit unacceptable material on the service 102. For example, the unacceptable emote criteria 133 may indicate that the given emote is considered unacceptable when either the image or the emote code is unacceptable individually. In other situations, the unacceptable emote criteria 133 may indicate that the combination of the content pair of the image and the emote code is considered unacceptable. In some situations, an image and a text string may not necessarily be unacceptable individually but may be considered unacceptable in combination.

Using the identifier training data set, a neural network-based unacceptable identifier detection machine learning model 134 may be trained to generate acceptability scores for proposed entity identifiers submitted to the network-accessible service 102. The model 134 may comprise at least (a) a character-level embedding layer and (b) a self-attention module and may not include a word-level embedding layer or other components which analyze sequences of words in the depicted embodiment. In contrast, unacceptable message detection machine learning models 135, which may also be trained and run by the unacceptable behavior response coordinators 138, may include word-level embedding layers and word sequence analysis components. In at least some embodiments, the unacceptable identifier detection model may also include a de-biasing component as well as other types of neural network layers, as described below in further detail. The unacceptable image detection machine learning model 136 may be trained to generate acceptability inferences for proposed images submitted as part of a proposed emote to the network-accessible service 102.

The unacceptable content pair detection machine learning model 137 may be trained to generate acceptability scores for proposed content pairs submitted to the network-accessible service 102. The model 137 may be trained to generate the acceptability scores based on the combination of the proposed image and the proposed text string for the proposed emote. In some embodiments, the acceptability scores may be referred to as an acceptability inference based on an analysis of the image and the text strong of the content pair.

After the unacceptable content pair detection model 137 has been trained, a trained version of the model may be stored in the depicted embodiment. In at least some embodiments, new versions of the model may be trained periodically, e.g., each day or each week, using the latest set of collected training examples, and the new versions may be used to replace the older versions if the performance achieved by the newer versions (e.g., on a holdout set of identifiers used for evaluation) is superior to that of the older versions. When new entity identifiers are submitted to the service 102, e.g., as part of an account establishment workflow, a trained version of the unacceptable content pair detection model may be executed to obtain an acceptability score for the submitted content pair. If the score is below a threshold, in at least some embodiments, the identifier may be rejected (and added to the database of rejected/unacceptable content pairs, from which a subsequent training data set may be prepared for re-training the model). If the score is above a threshold, the content pair may be accepted, and the content pair for the emote may also be added to the database used for generating training data. An emote that is rejected may be prompted to try a different content pair in at least some embodiments.

Figure 2:
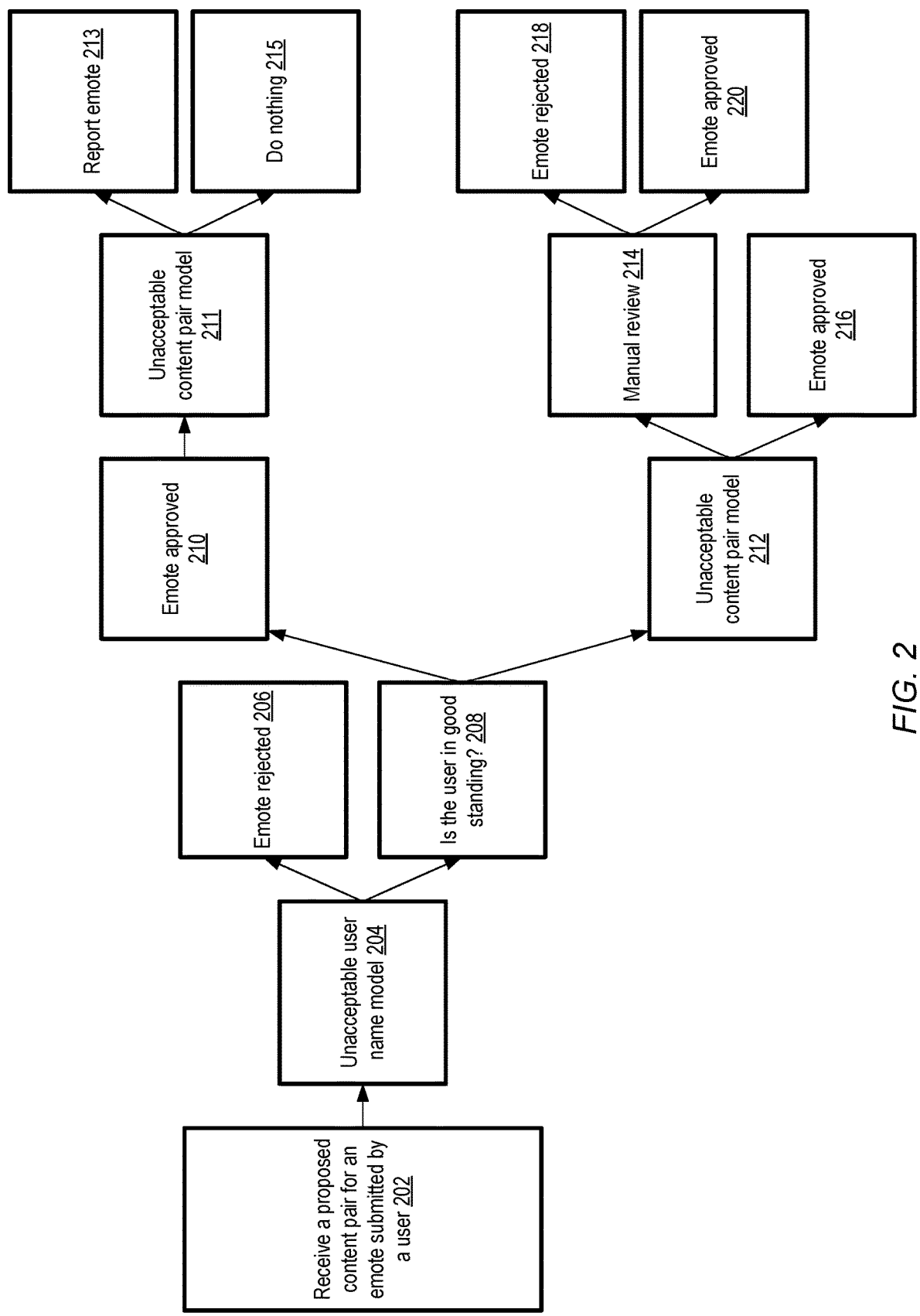
FIG. 2 illustrates a decision tree diagram for detecting unacceptable content pairs according to a neural network-based machine learning model implemented at a network-accessible service, according to some embodiments.

FIG. 2 illustrates a decision tree diagram for detecting unacceptable content pairs according to a neural network-based machine learning model implemented at a network-accessible service, according to some embodiments. The network-accessible service may correspond to the network-accessible service 102 of FIG. 1, according to some embodiments. The steps in the decision tree may be performed by an unacceptable content analysis system, such as the unacceptable content analysis subsystem 130 of FIG. 1, according to some embodiments.

The service may receive a proposed content pair for an emote submitted by a user, at 202. In some embodiments, the proposed content pair for the emote may include a proposed image and a proposed text string for an emote code. The user may submit the emote via a user interface provided by the service. For example, the user interface may be presented via a web-based interface or an application-based interface.

As an initial verification step, the proposed text string may be analyzed according to an unacceptable username model to determine whether the identifier is considered unacceptable, at 204. By rejecting an emote before the proposed image needs to be analyzed, computational resources may be conserved by quickly rejecting an emote based on its text string. In some embodiments, the unacceptable username model may correspond to the unacceptable identifier detection machine learning model 134 of FIG. 1. Based on a determination that the proposed text string is considered unacceptable, the submitted emote may be rejected, at 206.

Based on a determination that the proposed text string is considered acceptable, the decision tree may further include determining whether the user is in good standing with the service, at 208. In some embodiments, various criteria may be evaluated to determine whether the user is in good standing with the service. For example, the criteria may include an age of the user's account, a period of time since a most recent terms of service violation, an activity record for the user, or other similar metrics.

Based on a determination that the user is in good standing, the decision tree may further include approving the submitted emote, at 210. The proposed content pair for the submitted emote may be stored as an approved content pair such that other users may invoke the content pair and use the emote in a subsequent interaction with the service. For example, another user may enter the text string for the emote code to load the image of the image into a chat session with the service such that other users may see the emote during the chat session.

The service may further verify that the emote, as a content pair, is acceptable by applying an unacceptable content pair model to the emote, at 211. The unacceptable content pair model may correspond to the unacceptable content pair detection machine learning model 137 of FIG. 1, according to some embodiments. The unacceptable content pair model may be configured to determine whether the content pair of the emote is unacceptable according to unacceptable emote criteria, such as the unacceptable emote criteria 133 of FIG. 1. Based on a determination that emote is unacceptable according to the unacceptable content pair model, the emote may be reported to the service, at 213. For example, the emote may be reported to be reviewed by an agent of the service in order to determine if the emote may need to be removed after the emote was presumed to have been acceptable. Based on a determination that the emote is acceptable according to the unacceptable content pair model, the system performs no additional actions, at 215.

Based on a determination that the user is not in good standing, the submitted emote is analyzed according to the unacceptable content pair model, at 212. Based on a determination that emote is unacceptable according to the unacceptable content pair model, the emote may be subject to manual review, at 214. For example, an agent may perform a review when the machine learning model is incapable of rendering a definite answer as to the acceptability of the emote. Based on the manual review resulting in a determination that the emote is unacceptable, the emote may be rejected, at 218. Based on the manual review resulting in a determination that the emote is acceptable, the emote may be approved, at 220. Based on a determination that emote is acceptable according to the unacceptable content pair model, the emote may be approved, at 216.

Figure 3:
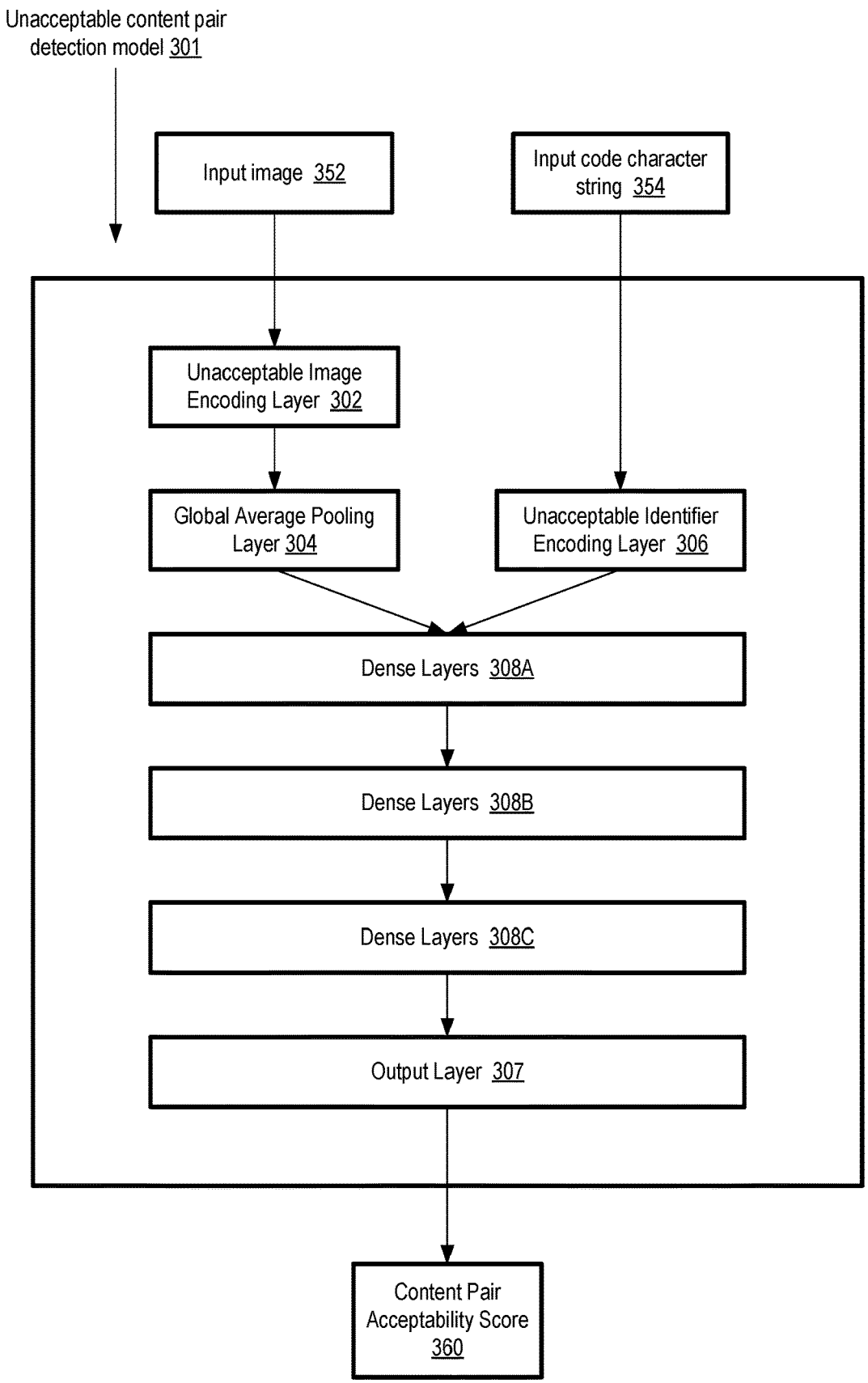
FIG. 3 illustrates an architecture of an example neural network-based machine learning model which may be used for unacceptable content pair detection, according to at least some embodiments.

FIG. 3 illustrates an architecture of an example neural network-based machine learning model which may be used for unacceptable content pair detection, according to at least some embodiments. An unacceptable content pair detection model 301 may include an unacceptable image encoding layer 302, a global average pooling layer 304, an unacceptable identifier encoding layer 306, dense layers 308A, 308B and 308C, and an output layer 307, according to some embodiments. The unacceptable content pair model 301 may correspond to the unacceptable content pair detection machine learning model 137 of FIG. 1, according to some embodiments. The output of the unacceptable content pair detection model 301 may be a content pair acceptability score 360 generated for an input content pair, such as for an emote, submitted by a user.

The unacceptable image encoding layer 302 may receive an input image 352 of a proposed content pair for an emote submitted by the user, according to some embodiments. In some embodiments, multiple resolutions of the input image 352 are provided by the user. In other embodiments, multiple resolutions of the input image 352 are generated upon receipt from the user. The unacceptable image encoding layer 302 may correspond to the unacceptable image detection machine learning model 136 of FIG. 1, according to some embodiments. In some implementations, the unacceptable image encoding layer 302 may include a MobileNetV2 model that has been trained to recognize images based on training data that includes numerous images used across the service and other communications channels. In some embodiments, the unacceptable image encoding layer 302 may output an image acceptability inference based on identifying the input image 352. In other embodiments, the unacceptable image encoding layer 302 may output a representation of the input image 352 that is comprehensible by subsequent layers of the unacceptable content pair detection model 301. In some embodiments, the unacceptable image encoding layer 302 may have layers frozen. For example, the unacceptable image encoding layer 302 may have X number of layers frozen to adjust weighting of the input image 352 when calculating the content pair acceptability score 360. The output of the unacceptable image encoding layer 302 may be then processed by a global average pooling layer 304, according to some embodiments. Additionally, the global average pooling layer 304 may include a dropout technique to mitigate overfitting the output of the unacceptable image encoding layer 302.

The unacceptable identifier encoding layer 306 may receive an input code character string 354, according to some embodiments. The unacceptable identifier encoding layer 306 may correspond to the unacceptable identifier detection machine learning model 134 of FIG. 1, according to some embodiments. In some embodiments, the unacceptable identifier encoding layer 306 may output a text string acceptability inference that indicates a likelihood that the input code character string 354 would be acceptable or not. In some embodiments, the unacceptable identifier encoding layer 306 may be configured to parse the input code character string 354 based on phonetic and textual components of the input code character string 354. The output of the unacceptable identifier encoding layer 306 may also include the components of the input code character string 354 in addition to the full text of the input code character string 354. In some embodiments, the unacceptable identifier encoding layer 306 may have layers frozen. For example, the unacceptable identifier encoding layer 306 may have Y number of layers frozen to adjust weighting of the input code character string 354 when calculating the content pair acceptability score 360. The model 301 may establish a weighting factor to determine the values of X and Y to increase or decrease the relative weights between the image 352 and the character string 354. The weighting factor may cause the model 301 to increase or decrease the importance of either the image 352 or the character string 354 in determining the acceptability score. For example, the weighting factor may cause unacceptable image or text acceptability inferences to more strongly affect the content pair acceptability score 360. In other words, an unacceptable image or text may be more likely to result in a content pair acceptability score 360 that indicates that the content pair is unacceptable.

The outputs of the global average pooling layer 304 and the unacceptable identifier encoding layer 306 may be provided to dense layers 308A, 308B and 308C to be processed by the unacceptable content pair detection model 301. In some embodiments, the one or more of the dense layers 308A, 308B and 308C may include a rectified linear activation function (ReLU), a dropout function, a softmax function, or any combination of these or more functions. For example, dense layers 308A and 308B may include a ReLU and a dropout function, and dense layers 308C may include a softmax function and a dropout function.

Figure 4:
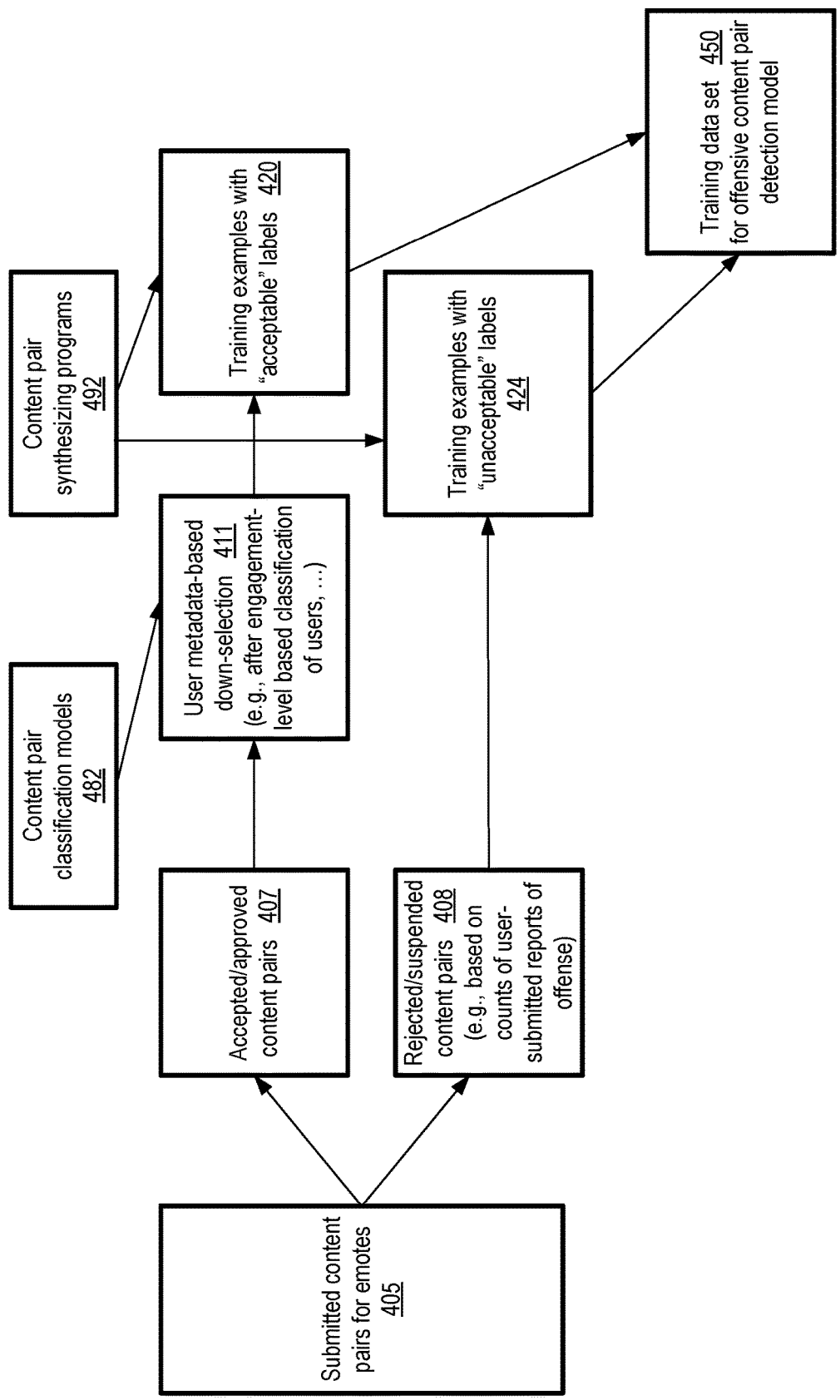
FIG. 4 illustrates example steps of preparation of a training data set for a machine learning model which generates acceptability scores for content pairs, according to at least some embodiments.

The output layer 307 may be configured to generate the output of the content pair acceptability score 360, according to some embodiments. The content pair acceptability score 360 may be used by a service, such as the network-accessible service 102 of FIG. 1, to determine whether to allow use of the emote or the content pair by users of the service. In some implementations, the content pair acceptability score 360 may be expressed as a real number between 0.0 and 1.0. In at least some implementations, a higher acceptability score for a given identifier may represent a higher chance of acceptability. In some implementations, a lower score may indicate a lower chance of acceptability. In some implementations, the content pair acceptability score 360 may indicate an acceptability inference FIG. 4 illustrates example steps of preparation of a training data set for a machine learning model which generates acceptability scores for content pairs (e.g., for user-submitted emotes), according to at least some embodiments. In the example scenario depicted in FIG. 4, the content pairs which are analyzed are emotes submitted to a service, such as the network-accessible service 102 of FIG. 1, according to some embodiments. However, similar techniques may be used for other categories of content pairs, such as audio and video pairs, video and naming pairs, and the like in various embodiments. The process illustrated in FIG. 4 may be employed not just for an initial training of the model, but also retraining of the model in at least some embodiments.

In the depicted embodiment, a collection of submitted content pairs for emotes 405, submitted by users of the service, may be accumulated at the service. From the submitted content pairs, two subsets may be extracted: accepted/approved content pairs 407 and rejected/suspended content pairs 408. The rejected/suspended content pairs 408 may have been rejected/suspended for a variety of reasons in different embodiments, such as the count of user-submitted reports of offense or abuse directed at usage of individual ones of the content pairs included in the rejected/suspended content pairs 408 or based on low acceptability scores generated by an earlier version of the model. For example, a content pair in the rejected/suspended content pairs 408 may be used in an abusive manner although the content pair itself is not inherently unacceptable.

At least some of the rejected/suspended content pairs 408 may be used as training examples 424 which are labeled as "unacceptable" in the depicted embodiment. In some embodiments, user metadata-based down-selection operations 411 may be performed on the accepted/approved content pairs 407 to determine the training examples 320 to which the "acceptable" label is assigned. For example, there may be hundreds of thousands, or even millions, of accepted content pairs in the submitted content pairs 405, and one or more content pairs classification models 482 may be used to group the content pairs into categories in some embodiments. Content pairs may be classified based on the rate at which they are reported on the service or application for which content pair analysis is being performed, how often the emotes are used, the chat sessions that frequently invoke the emotes, and so on. The metadata stored at the service for the content pairs may indicate the class into which each of the emotes have been placed by a classification model 482. In some embodiments, content pairs that have been classified as reported but validated and are thus verified or trusted to at least some extent, may be included as examples to which the label "acceptable" is assigned.

In at least one embodiment, one or more content pair synthesizing programs 492 may be used to generate artificial content pairs (e.g., emotes that have not been submitted by users) to be used as "acceptable" examples and/or "unacceptable" examples. For example, random images and random strings of a permitted length may be generated and used as acceptable examples, while variants of known abusive or offensive images or terms may be generated and used as examples with the "unacceptable" label.

The training data set 450 for the content pair analysis model may be generated by combining examples with "acceptable" labels 420 and examples with "unacceptable" labels 424 in the depicted embodiment. Test data sets and/or evaluation data sets for the model may also be selected (e.g., using random sampling) from the examples with both types of labels in at least some embodiments. In some embodiments, a manually determined content pair may be used as a seed for an acceptable or an unacceptable content pair. For example, an image and associated text may acquire a new and unacceptable meaning in the current cultural zeitgeist such that the acquired meaning is unacceptable when it was acceptable at a previous time. An unacceptable data set seed request may include an unacceptable seed content pair that would not have been detected by the unacceptable content pair detection model. The unacceptable seed content pair may then be added to the unacceptable content pairs such that subsequent training of the model would detect that the unacceptable seed content pair is to be deemed an unacceptable content pair.

Figure 5:
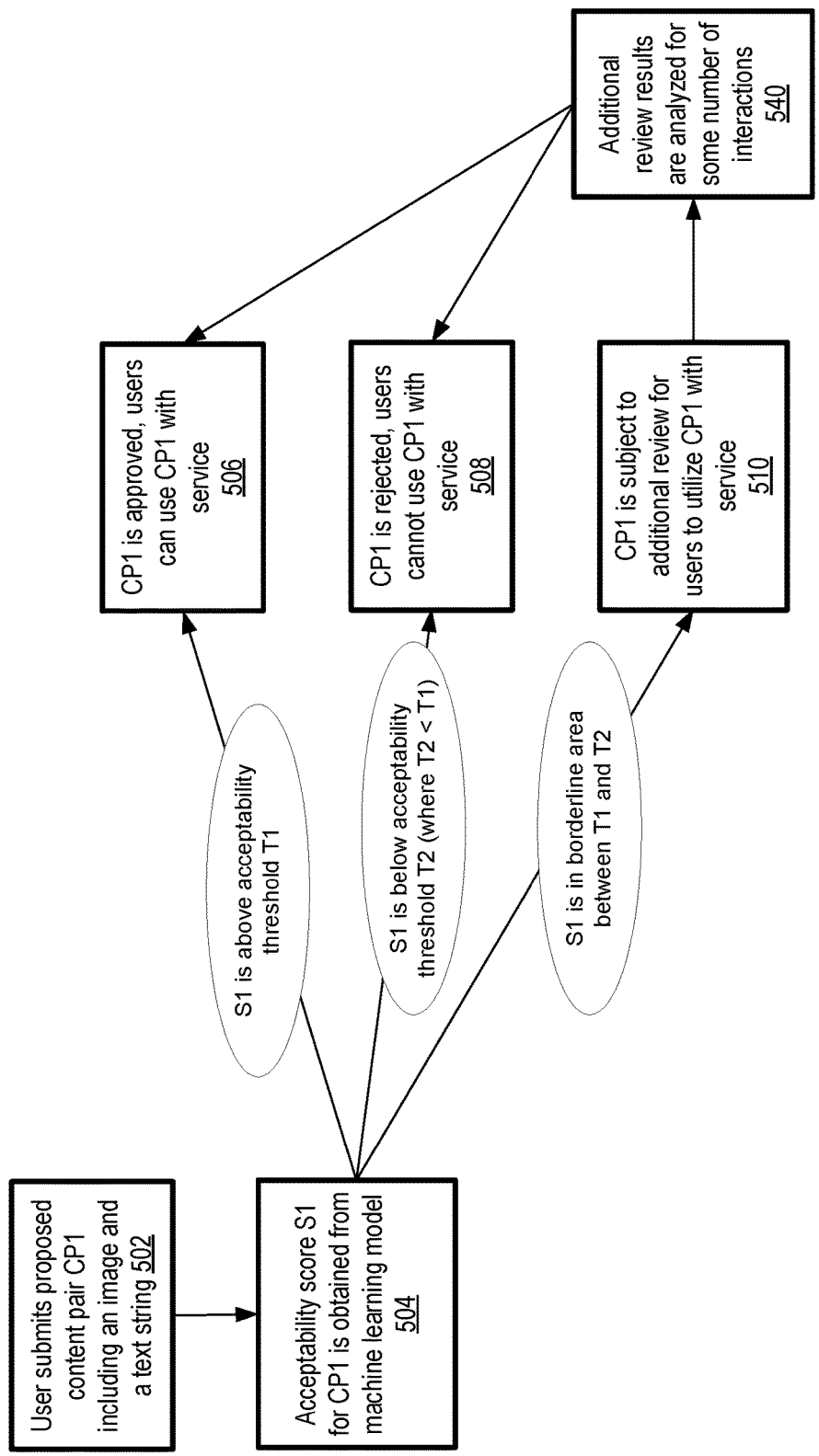
FIG. 5 illustrates examples of the kinds of actions which may be initiated at a network-accessible service based on acceptability scores generated for proposed content pairs, according to at least some embodiments.

FIG. 5 illustrates examples of the kinds of actions which may be initiated at a network-accessible service based on acceptability scores generated for proposed content pairs, according to at least some embodiments. The proposed content pairs may include an image and a text string representing an emote submitted by a user. When a user of such a service submits a proposed content pair CP1, as indicated in element 502, an acceptability score S1 may be generated for CP1 using a machine learning model similar to that described above in the context of FIG. 3, as indicated in element 504 of FIG. 5. Higher acceptability scores are assumed to indicate higher acceptability in the embodiment depicted in FIG. 5.

If S1 is above a first pre-determined acceptability threshold T1, CP1 may be approved in the depicted embodiment, and the user may begin normal interactions to utilize various features of the service as indicated in element 506. If S1 is below a different threshold T2 (where T2<T1), CP1 may be rejected (element 508), and the user may be requested to submit a different proposed content pair for another emote, which may be subjected to the same type of analysis as CP1. In some embodiments, CP1 may not necessarily be rejected without a manual review process.

If S1 lies in a borderline range between T1 and T2, a different approach may be taken in the depicted embodiment, as indicated in elements 510 and 540. CP1 may be tentatively or provisionally approved, but additional review may be implemented to grant access to CP1 at the service. After the results of the additional review for a pre-determined number of interactions of CP1 with the service are obtained (e.g., used for a period of time without user reports of offensiveness), CP1 may be approved or rejected for at least a selected time period in the depicted embodiment.

In at least one embodiment, in scenarios in which the same user tries creating several different content pairs during a given session, and the content pairs are rejected based on possible offense, the system may treat further attempts to create content pairs by that user somewhat differently. If the user finally provides another content pair which would otherwise have been accepted easily as an acceptable content pair, the fact that there were several unsuccessful attempts by that user may be taken into account when deciding how to treat the acceptable content pair. Such behavior, in which a single user tries out several unacceptable content pairs in quick succession, may alert the unacceptable content analysis subsystem that that user may be intending to cause offense eventually, and may be trying to work around the subsystem's offense detection capabilities, so the user may in effect be placed on probation (and treated in a manner similar to a user whose proposed content pair has a borderline score).

In some embodiments, one or more of the parameter values used in the scenario depicted in FIG. 5 may be tuned over time. For example, the thresholds T1 and T2, and/or the additional review needed for borderline acceptability scores may all be adjusted based on tracking the rate of offense complaints, the total number of content pairs rejected per unit time, the number of distinct uses of the emote for a given content pair, and/or other metrics.

As mentioned earlier, machine learning based analysis of identifiers may be performed for a variety of categories of identifiers in any of several problem domains in different embodiments. FIG. 6 illustrates examples of the types of entity identifiers for which unacceptable content analysis may be performed, according to at least some embodiments. Account identifiers or user names 610 to be used to access the functionality of a given network-accessible or application may, for example, be selected by end users at the time at which they sign up for the service or application.

Some services, including popular services that enable thousands of end users to view, and share feedback on, the progress of video game contests or other dynamic visual content may allow the end users to select icons represent the end users' emotions, feelings or thoughts more concisely than sentences or phrases. Such icons, which are conceptually similar to emojis supported by various communication providers for text messages but may sometimes be exclusive to the service (or even limited for use by specific sub-groups of users of the service, or individual end users), may be referred to as "emotes" or emoticons in some embodiments. In some services or applications, users may submit images to be uses as such icons. The icons may each have a respective character-based label or identifier string, referred to in some cases as a code, which may be accessible to users of the service who wish to use the icons and/or interpret the intended meanings of the icons. Such string code identifiers for icons 612 may represent another category of identifiers which may be analyzed for unacceptable content in at least some embodiments.

URL shorteners 614 and domain names 616 represent other categories of identifiers which may be chosen by users and checked for acceptability using machine learning techniques of the kind introduced herein in some embodiments. As indicated by the name, URL shorteners provide short versions of Uniform Resource Locators used as web addresses, so that for example instead of having to enter a long URL such as http://<exampledomain.com>/departmentA/sectionB/partC/pageD into a web browser, a user can use a unique shortened URL http://<string1>/<string2> which leads to the same web page as the original loner URL. If the owner/administrator of a service for providing URL shorteners allows its clients to select the strings used for at least a portion of the short versions of the URLs, such strings may be analyzed for acceptability using machine learning in various embodiments. Similarly, portions or all of full domain names selected by users for web sites may be analyzed for acceptability in at least some embodiments.

According to some embodiments, hashtags 618 (e.g., selected by end users and utilized to refer to topics, ideas or entities within social media message postings) may be analyzed for unacceptable content prior to being approved and displayed, e.g., by the service or application which is being used to convey/display messages which include the hashtags. In at least one embodiment, file names 620 (and/or folder names or other names of storage objects at shared repositories) which may be viewed by multiple users may be analyzed using the techniques proposed herein. Other types of entity identifiers, not shown in FIG. 6, may also or instead be analyzed in some embodiments prior to approval by a service or an application.

Figure 7:
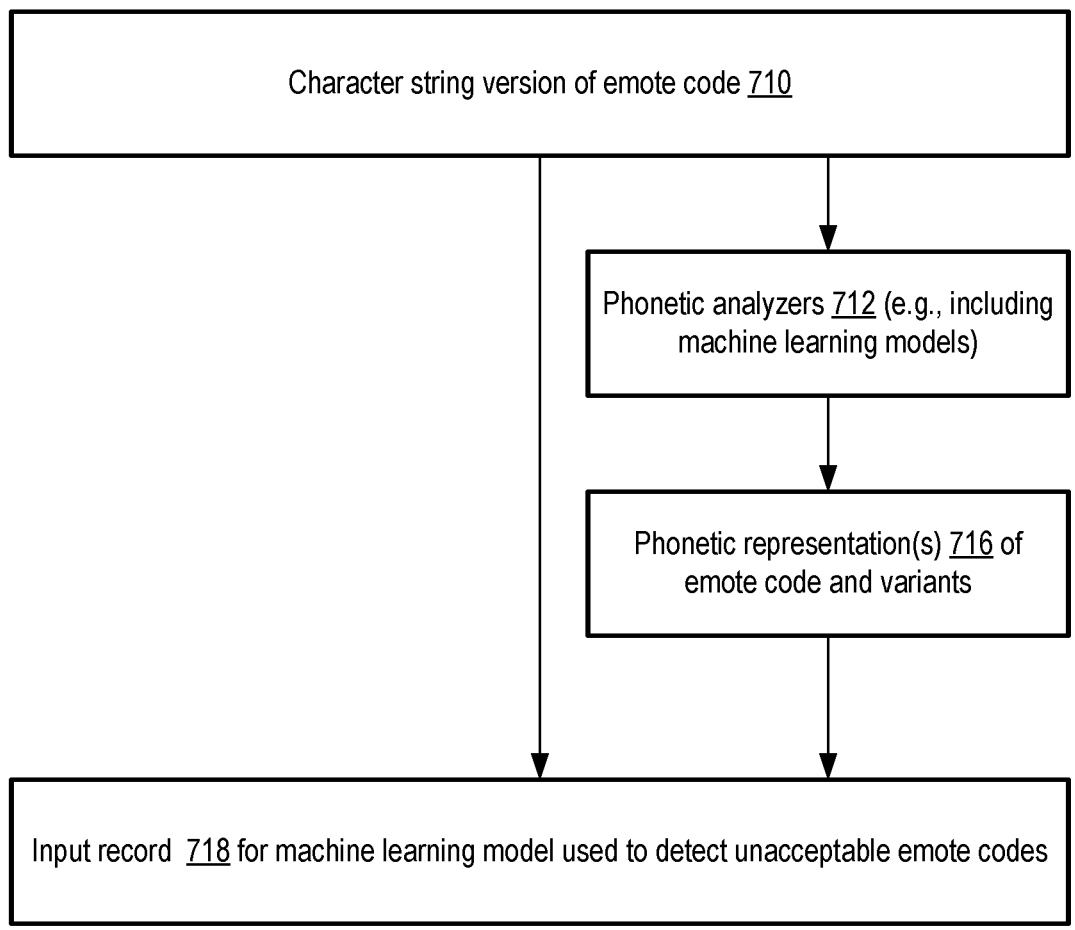
FIG. 7 illustrates an example use of phonetic representations of identifiers for unacceptable content analysis, according to at least some embodiments.

FIG. 7 illustrates an example use of phonetic representations of identifiers for unacceptable content analysis, according to at least some embodiments. In some cases, offense may be caused to some users of a service by the way an emote code (or a portion of an emote code) sounds when pronounced, and as a result, analysis of the written version of the emote code may by itself be insufficient to determine acceptability of the emote code.

In the embodiment shown in FIG. 7, a character string version of an emote code 710 may be provided as input to one or more phonetic analyzers 712. The phonetic analyzers 712 may, for example, include machine learning models and/or other programs which are capable of transforming written text sequences into corresponding sounds. Phonetic representation(s) 716 of the original character string and/or variants thereof may be created using the phonetic analyzers and included in the input record 718 corresponding to the emote code in at least some embodiments. Phonetic representations may be created for training examples (including both acceptable and unacceptable emote codes) as well for emote codes analyzed after the model has been trained in various embodiments. In some embodiments, only the phonetic representations or only the character string versions may be used as input to the model.

Figure 8:
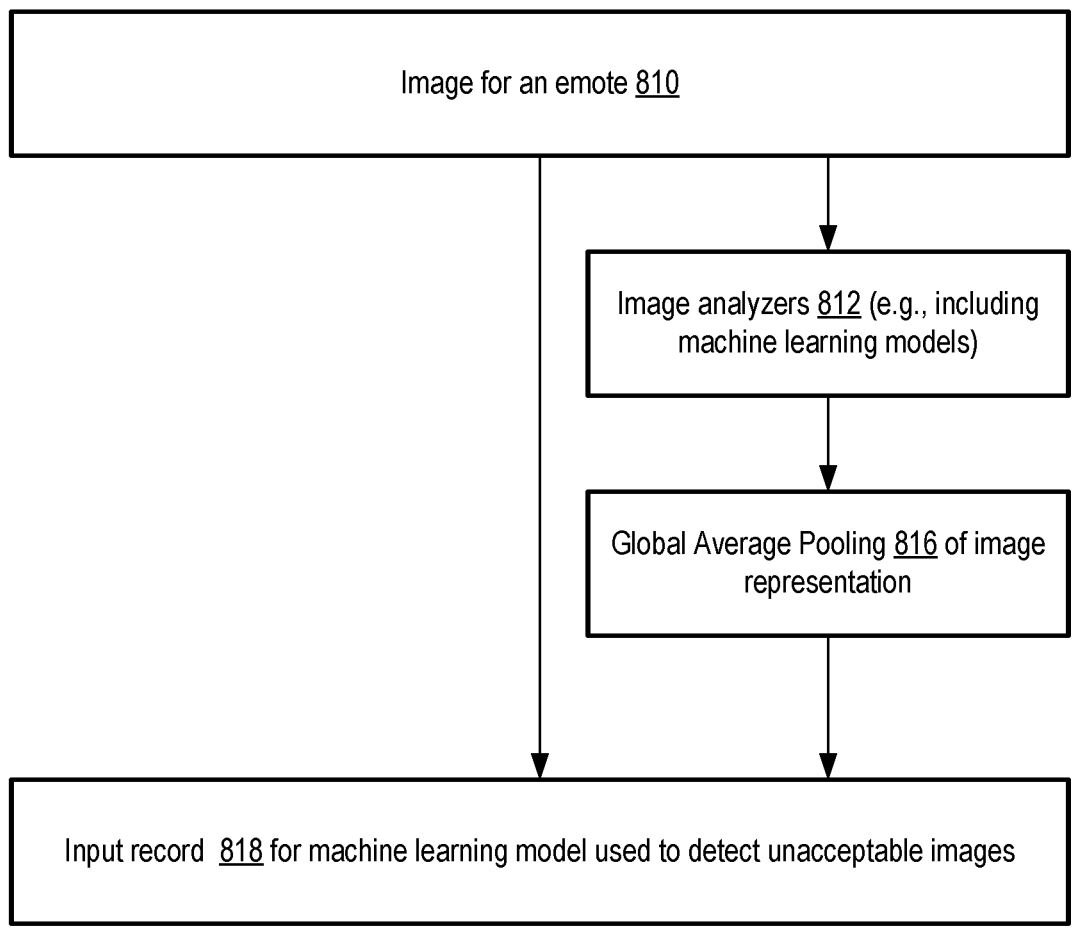
FIG. 8 illustrates an example use of processing images for unacceptable content analysis, according to at least some embodiments.

FIG. 8 illustrates an example use of processing images for unacceptable content analysis, according to at least some embodiments. In some cases, offense may be cause to some users of a service based on the appearance of an image.

In the embodiment shown in FIG. 8, an image for an emote 810 may be provided as input to one or more image analyzers 812. The image analyzers 812 may, for example, include machine learning models and/or other programs which are capable of transforming images to a representation of the image in a format or structure that is comprehensible by computer-based algorithms. In some embodiments, global average pooling 816 may be performed on the representation of the image to reduce overfitting of the image into a model space of the machine-learning models. The image 810 and the representation of the image may be included in an input record 818 for the machine learning model used to detect unacceptable images.

FIG. 9 illustrates a flowchart diagram for a method 900 for training a neural network-based machine learning model for detecting unacceptable content pairs, such as for emotes in a network-accessible service, according to some embodiments. The method 900 may be performed by an unacceptable content analysis system, such as the unacceptable content analysis subsystem 130 of FIG. 1, according to some embodiments. The neural network-based machine learning model may correspond to the unacceptable content pair detection machine learning model 137 of FIG. 1, according to some embodiments.

The method 900 may include identifying or selecting acceptable content pairs and unacceptable content pairs to be included in a training data set for an unacceptable content pair detection model for a network-accessible service or application at which approved content pairs usable by users of the network-accessible service or application, where the content pairs include an image and a text string, at 902. In some embodiments, the acceptable content pairs may include content pairs that have been accepted or approved by the service, and unacceptable content pairs may include content pairs that have been rejected or removed by the service. For example, the acceptable content pairs may correspond to emotes that have been approved for use on the service, such as in chat sessions at the service, and the unacceptable content pairs may correspond to emotes that have been deemed unacceptable and not permitted for use on the service.

The method 900 may also include training a neural network-based machine learning model using the training data set to generate acceptability scores for new content pairs (i.e., content pairs not in the training data set), where the model may include depth layers, an unacceptable image model, and an unacceptable text model, at 904. The machine learning model may correspond to the unacceptable content pair detection machine learning model 137 of FIG. 1 or the unacceptable content pair detection model 301 of FIG. 3, according to some embodiments. The training of the model may be performed in accordance with the steps described in FIG. 4.

The method 900 may further include storing a trained version of the machine learning model, at 906. The method 900 may also include updating training data sets periodically, retrain the model, and at least a selected subset or sample of the existing approved content pairs may be re-scored using the retrained version of the model to determine whether some content pairs have to be rejected, at 908. The trained version of the machine learning model may be stored by the unacceptable content analysis system for future implementations of the machine learning model. For example, the trained version of the machine learning model may be used to determine whether a proposed emote is unacceptable and should be accepted or rejected for use in the service. In some embodiments, the trained version of the machine learning model may be retrained with additional data sets, such as seed data sets. In some situations, the machine learning model may be retrained based on a determination that the output acceptability scores have degraded or drifted from an accuracy target. For example, the machine learning model may be monitored to determine whether the output acceptability scores are consistent with a manual review process. In some situations, the acceptability thresholds may be updated after retraining. In some embodiments, the model may be validated according to a validation data set that is different from the training data set. For example, the validation data set may include content pairs that are not included as part of the training data set to determine whether the trained model is working properly.

Figure 10:
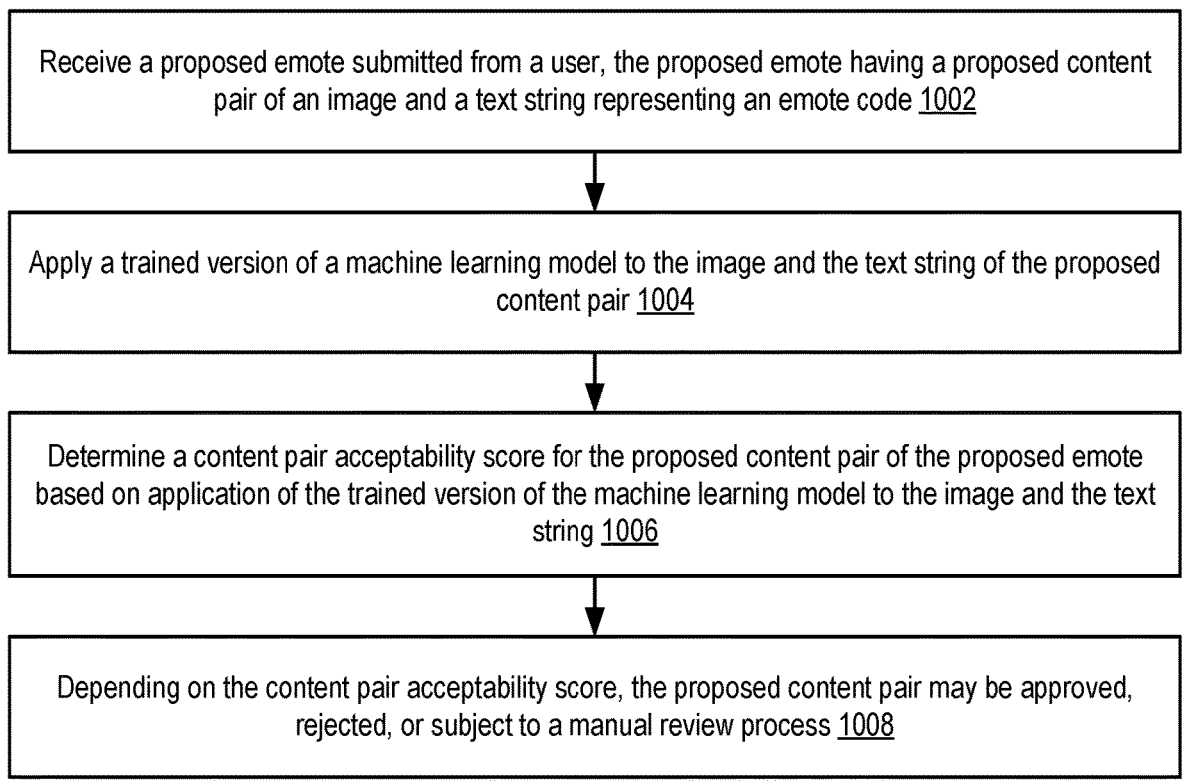
FIG. 10 illustrates a flowchart diagram for a method for detecting unacceptable content pairs according to a neural network-based machine learning model, according to some embodiments.

FIG. 10 illustrates a flowchart diagram for a method 1000 for detecting unacceptable content pairs according to a neural network-based machine learning model, according to some embodiments. The content pairs may include an image and a text string for an emote used on a service.

The method 1000 includes receiving a proposed emote submitted from a user, the proposed emote having a proposed content pair of an image and a text string representing an emote code, at 1002. The user may submit the proposed emote via an interface with a service, such as the network-accessible service 102 of FIG. 1, according to some embodiments.

The method 1000 also includes determining, from a trained version of a machine learning model, an image acceptability inference for the image and a text acceptability inference for the text string, at 1004. The trained version of the machine learning model may be generated as described with regard to the method 900 illustrated in FIG. 9, according to some embodiments. The machine learning model may include additional machine learning models as components of the machine learning model as a whole. The additional machine learning models may include an unacceptable image detection model, such as the unacceptable image detection machine learning model 136 of FIG. 1, and an unacceptable text detection model, such as the unacceptable identifier detection machine learning model 134 or the unacceptable message detection machine learning model 135 of FIG. 1, according to some embodiments. The image acceptability inference may indicate whether the image is individually considered unacceptable, and the text acceptability inference may indicate whether the text string is individually considered unacceptable.

The method 1000 further includes determining a content pair acceptability score for the proposed content pair of the proposed emote based at least in part on the image acceptability inference, the text acceptability inference, and the combination of the image and the text string, at 1006. In some embodiments, the proposed emote may be deemed to be unacceptable when at least one of the image acceptability inference or the text acceptability inference is indicative of an unacceptable image or unacceptable text string. For example, when either the image or the text string is considered unacceptable, then the content pair of the image and the text string would be considered unacceptable. In other situations, the image and the text string may be individually acceptable, but the combination of the image and the text string may cause the emote to be considered unacceptable. In some implementations, the content pair acceptability score may be expressed as a real number between 0.0 and 1.0. In at least some implementations, a higher acceptability score for a given identifier may represent a lower estimated risk of that identifier causing offense. In some implementations, a lower score may indicate a lower risk of causing offense.

The method 1000 further includes depending on the content pair acceptability score, the proposed content pair may be approved, rejected, or subject to a manual review process, at 1008. For example, the content pair acceptability score may be compared with a threshold for acceptable content pairs. Based on the content pair acceptability score satisfying the threshold, the content pair may be approved as an emote for the service. Based on the content pair acceptability score not satisfying the threshold, the content pair may be rejected as an emote for the service. In some situations, the content pair acceptability score may fall in an indeterminate range that would require additional review of the content pair to determine approval. The additional review may include a manual review process performed by an agent of the service, according to some embodiments. For example, the additional review may result in approval or rejection depending on the results of the manual review process.

Figure 11:
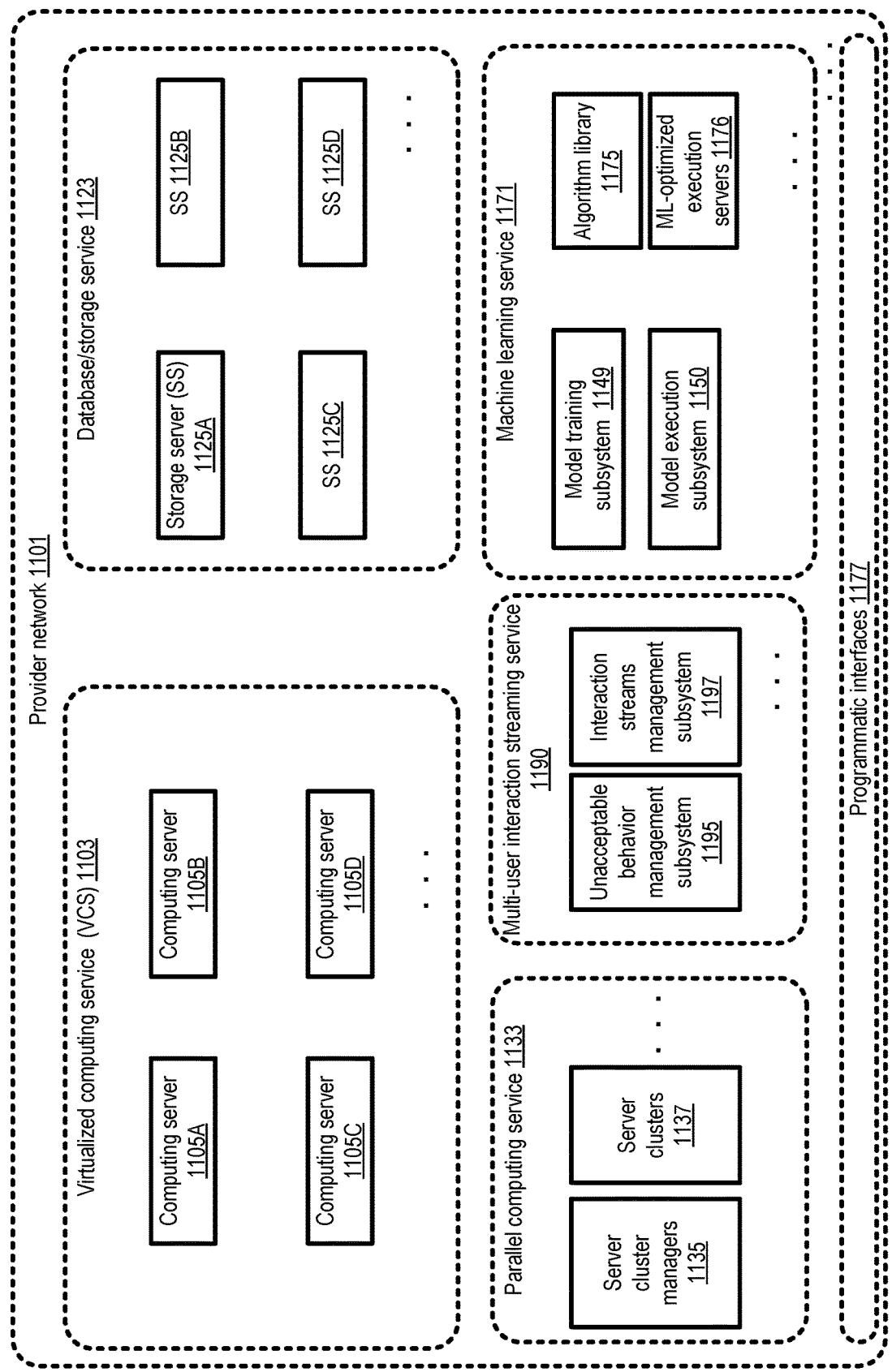
FIG. 11 illustrates an example provider network environment in which a machine learning service used for identifier analysis may be implemented, according to at least some embodiments.

FIG. 11 illustrates an example provider network environment in which a machine learning service used for identifier analysis may be implemented, according to at least some embodiments. In the depicted embodiment, provider network 1101 may comprise resources used to implement a plurality of services, including for example a virtualized computing service (VCS) 1103, a database/storage service 1123, a parallel computing service 1133 as well as a machine learning service 1171 within which automated analysis of the kind described above to detect potentially unacceptable identifiers may be conducted. In some embodiments, a multi-user interaction streaming service 1190 to which the identifiers to be analyzed are submitted by its end users may also be implemented at least in part at the provider network 1101. The streaming service 1190 may comprise an unacceptable behavior management subsystem 1195 (similar in functionality to unacceptable content analysis subsystem 130 of FIG. 1) as well as an interaction streams management subsystem 1197 (similar in functionality to real-time interactions management subsystem 140 of FIG. 1) in some embodiments.

The machine learning service 1171, which may also be referred to as an analytics service or an artificial intelligence service, in turn may comprise algorithm library 1175, model training subsystem 1149 at which various types of models may be trained and re-trained using algorithms from library 1175, model execution subsystem 1150 at which the models are executed, as well as a set of machine learning-optimized execution servers 1176 (e.g., servers comprising chipsets developed specifically for ML tasks) in the depicted embodiment. The parallel computing service 1133 may include various server clusters 1137, each comprising a plurality of servers, on which parallelizable workloads may be distributed by a set of server cluster managers 1135 in the depicted embodiment. Some of the algorithms implemented at the machine learning service 1171 may be parallelizable and may utilize the server clusters 1137 in at least some embodiments. In at least one embodiment, the provider network 1101 may include a software container management service which may be employed to create and store container images to be used for training or executing machine learning models similar to the neural network-based model illustrated in FIG. 4.

Components of a given service may utilize components of other services in the depicted embodiment—e.g., for some machine learning service tasks and or stream-related tasks of service 1190, virtual machines implemented at computing servers such as 1105A-1105D of the virtualized computing service 1103 may be used, server clusters 1137 and/or cluster managers 1135 may be utilized for parallelizable computations of the machine learning service, input data, metrics and/or output produced at the machine learning service may be stored at storage servers 1125 (e.g., 1125A-1125D) of storage service 1123, and so on. Individual ones of the services shown in FIG. 11 may implement a respective set of programmatic interfaces 1177 which can be used by external and/or internal clients (where the internal clients may comprise components of other services) in the depicted embodiment.

Figure 12:
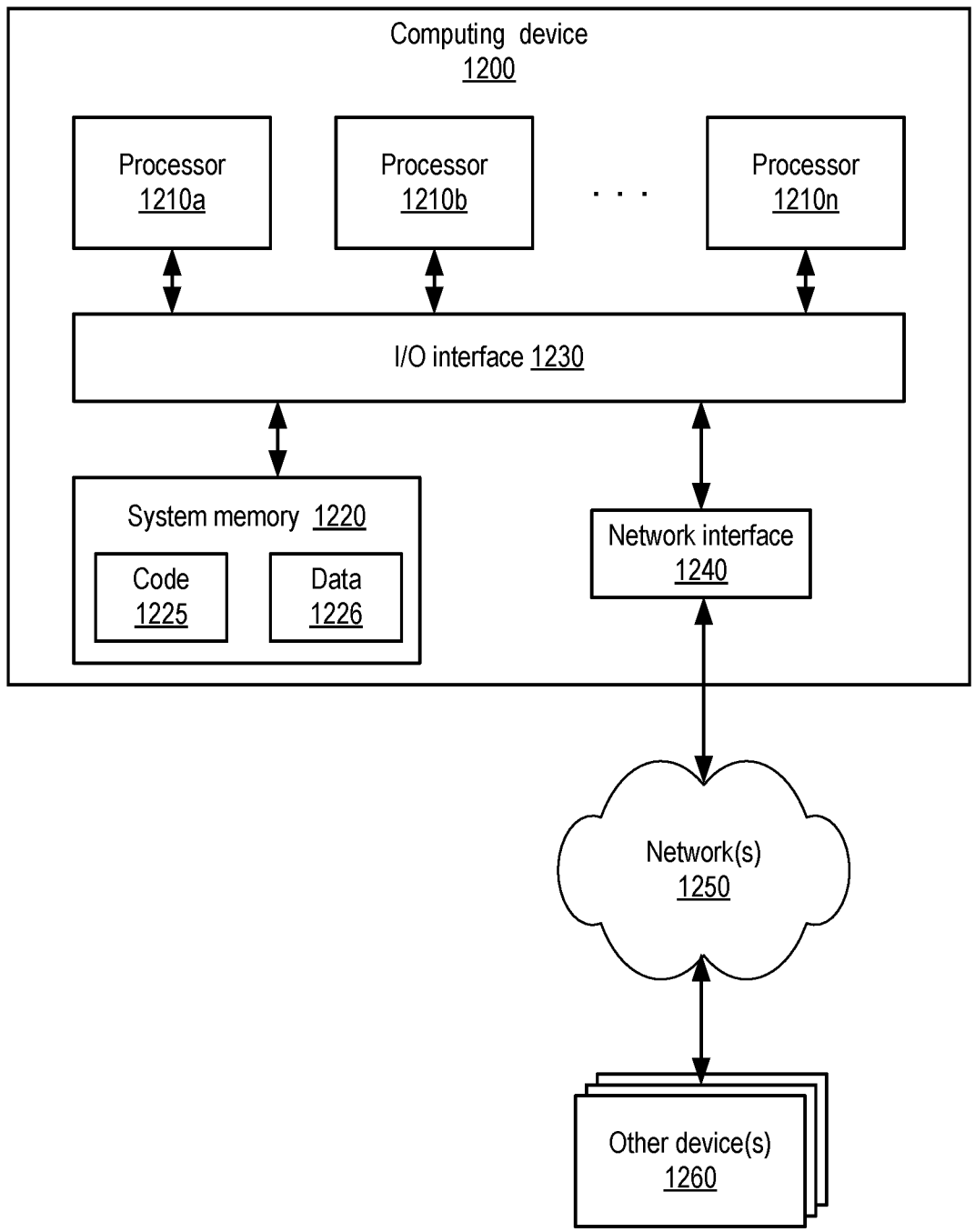
FIG. 12 is a block diagram illustrating an example computer system that may be used in some embodiments.

Any of various computer systems may be configured to implement techniques for managing memory compression in a secure manner, as disclosed herein. For example, FIG. 12 is a block diagram illustrating one embodiment of a computer system suitable for implementing some or all of the techniques and systems described herein. For example, each of the computer systems may host one or more respective containers. In some cases, a host computer system may host multiple containers. In various embodiments, the provider network may include one or more computer systems 1200 such as that illustrated in FIG. 12 or one or more components of the computer system 1200 that function in a same or similar way as described for the computer system 1200.

In the illustrated embodiment, computer system 1200 includes one or more processors 1210 coupled to a system memory 1220 via an input/output (I/O) interface 1230. Computer system 1200 further includes a network interface 1240 coupled to I/O interface 1230. In some embodiments, computer system 1200 may be illustrative of servers implementing enterprise logic or downloadable application, while in other embodiments servers may include more, fewer, or different elements than computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions on or across the processors 1210. For example, in various embodiments, processors 1210 may be embedded processors implementing any of a variety of instruction set architectures (ISAs), such as the x86, x86-64, ARM, PowerPC, SPARC, or MIPS ISAs, or any other suitable ISA. In multiprocessor systems, each of processors 1210 may commonly, but not necessarily, implement the same ISA.

System memory 1220 may be configured to store instructions and data accessible by processor 1210. In various embodiments, system memory 1220 may be implemented using one or more of any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the management of securely memory compression are shown stored within system memory 1220 as program instructions 1224. In some embodiments, system memory 1220 may include data 1225 which may be configured as described herein.

In one embodiment, I/O interface 1230 may be configured to coordinate I/O traffic between processor 1210, system memory 1220 and any peripheral devices in the system, including through network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments, some or all of the functionality of I/O interface 1230, such as an interface to system memory 1220, may be incorporated directly into processor 1210.

Network interface 1240 may be configured to allow data to be exchanged between computer system 1200 and other devices attached to a network, such as between client devices (e.g., 1260, etc.) and other computer systems, or among hosts, for example. In particular, network interface 1240 may be configured to allow communication between computer system 1200 and/or various other devices 1260 (e.g., I/O devices). Other devices 1260 may include scanning devices, display devices, input devices and/or other communication devices, as described herein. Network interface 1240 may commonly support one or more wireless networking protocols (e.g., Wi-Fi/IEEE 802.11, or another wireless networking standard). However, in various embodiments, network interface 1240 may support communication via any suitable wired or wireless general data networks 1270, such as other types of Ethernet networks, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1200 via I/O interface 1230. A computer-readable storage medium may also include any volatile or non-volatile media such as RAM (e.g. SDRAM, DDR SDRAM, RDRAM, SRAM, etc.), ROM, etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, which may be implemented via network interface 1240.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 1200, including one or more processors 1210 and various other devices (though in some embodiments, a computer system 1200 implementing an I/O device 1250 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1200. In general, an I/O device (e.g., cursor control device, keyboard, or display(s) may be any device that can communicate with elements of computing system 1200.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on one or more computer-readable storage media coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   one or more computing devices comprising:
     one or more processors; and
     a memory storing instructions that, when executed on or across the one or more processors, cause the one or more computing devices to implement an emote management system configured to:
       receive a request to make an emote available for users of an application for inclusion in a real-time content stream provided by the application, wherein the emote includes a proposed content pair comprising an image and a text string;
       determine, based on application of a machine learning model to the content pair, whether the proposed content pair satisfies a content pair acceptability threshold; and
       based on a determination that the proposed content pair satisfies the content pair acceptability threshold, return a response to the first client indicating that the proposed content pair is an accepted content pair.

2. The system of claim 1, wherein the emote management system is further configured to:
   train, using a training data set including an acceptable data set and an unacceptable data set, the machine learning model, wherein the acceptable data set comprises acceptable combinations of images and text strings, and wherein the unacceptable data set comprises unacceptable combinations of images and text strings.

3. The system of claim 2, wherein the emote management system is further configured to:
receive an unacceptable data set seed request including an unacceptable seed content pair comprising an acceptable seed image and an acceptable seed text string whose combination is unacceptable;
add the unacceptable seed content pair to the unacceptable data set; and
retrain, using the training data set including the unacceptable content pair, the neural network-based machine learning model.

4. The system of claim 1, further comprising:
a content display system configured to:
receive, from the first client, media content;
stream, from the content display system to a second client via a streaming interface, at least a portion of the media content;
receive, from the second client, the text string;
in response to receiving the text string, display the image to the first client and the second client via the streaming interface provided by the application.

5. The system of claim 1, wherein to determine whether the proposed content pair satisfies the content acceptability threshold, the content submission management system is further configured to:
determine an image acceptability inference for the image according to the neural network-based machine learning model;
determine a text acceptability inference for the text string according to the neural network-based machine learning model;
based on the image acceptability inference indicating that the image is unacceptable or the text acceptability inference indicating that the text string is unacceptable, determine that the proposed content pair does not satisfy the content acceptability threshold; and
reject the proposed content pair.

6. A method, comprising:
performing, by one or more computing devices:
receiving a proposed content pair from a client to make the proposed content pair available for users of an application to select for inclusion in real-time content provided by the application, wherein the proposed content pair comprises an image and a text string;
determining, based on an acceptability inference generated for the content pair from a trained machine learning model, whether the proposed content pair satisfies a content pair acceptability threshold; and
based a determination that the proposed content pair satisfies the content pair acceptability threshold, providing the proposed content pair to users for inclusion in real-time content provided by the application.

7. The method of claim 6, further comprising:
training, using a training data set including an acceptable data set and an unacceptable data set, the machine learning model, wherein the acceptable data set comprises acceptable combinations of images and text strings, and wherein the unacceptable data set comprises unacceptable combinations of images and text strings.

8. The method of claim 7, further comprising:
receiving an unacceptable data set seed request including an unacceptable seed content pair comprising at least one of an acceptable seed image and an acceptable seed text string whose combination is unacceptable;
adding the unacceptable seed content pair to the unacceptable data set; and
retraining, using the training data set including the unacceptable content pair, the machine learning model.

9. The method of claim 7, further comprising:
validating the machine learning model according to a validation data set that is different from the training data set.

10. The method of claim 6, further comprising:
receiving, from a second client, the text string;
in response to receiving the text string, displaying the image to the client and the second client via an interface provided by the application.

11. The method of claim 10, further comprising:
receiving, from the client, media content;
streaming, from the content display system to the second client via the interface, at least a portion of the media content.

12. The method of claim 6, wherein determining whether the proposed content pair satisfies the content acceptability threshold comprises:
determining an image acceptability inference for the image according to the machine learning model;
determining a text acceptability inference for the text string according to the machine learning model;
based on the image acceptability inference indicating that the image is unacceptable or the text acceptability inference indicating that the text string is unacceptable, determining that the proposed content pair does not satisfy the content acceptability threshold; and
rejecting the proposed content pair.

13. The method of claim 12, wherein determining whether the proposed content pair satisfies the content acceptability threshold comprises:
determining the acceptability inference based on the image acceptability inference and the text acceptability inference, wherein a weighting factor is applied to the image acceptability inference or the text acceptability inference based on whether the image acceptability inference indicates that the image is unacceptable or the text acceptability inference indicating that the text string is unacceptable.

14. One or more computer-readable storage media storing instructions that, when executed on or across one or more processors, cause the one or more processors to:
in response to receiving a proposed content pair from a client to make the proposed content pair available for users of an application to select for inclusion in real-time content provided by the application, determine, based on an acceptability inference generated for the content pair from a trained machine learning model, whether the proposed content pair satisfies a content pair acceptability threshold; and based a determination that the proposed content pair satisfies the content pair acceptability threshold, provide the proposed content pair to users for inclusion in real-time content provided by the application.

15. The one or more computer-readable storage media of claim 14, further comprising instructions that, when executed on or across the one or more processors, cause the one or more processors to:
train, using a training data set including an acceptable data set and an unacceptable data set, the machine learning model, wherein the acceptable data set comprises acceptable combinations of images and text strings, and wherein the unacceptable data set comprises unacceptable combinations of images and text strings.

16. The one or more computer-readable storage media of claim 15, further comprising instructions that, when executed on or across the one or more processors, cause the one or more processors to:
   in response to receiving an unacceptable data set seed request including an unacceptable seed content pair comprising an acceptable seed image and an acceptable seed text string whose combination is unacceptable, add the unacceptable seed content pair to the unacceptable data set; and
   retrain, using the training data set including the unacceptable content pair, the machine learning model.

17. The one or more computer-readable storage media of claim 14, further comprising instructions that, when executed on or across the one or more processors, cause the one or more processors to:
   validate the machine learning model according to a validation data set that is different from the training data set.

18. The one or more computer-readable storage media of claim 14, further comprising instructions that, when executed on or across the one or more processors, cause the one or more processors to:
   in response to receiving the text string from a second client, displaying the image to the client and the second client via an interface provided by the application.

19. The one or more computer-readable storage media of claim 14, further comprising instructions that, when executed on or across the one or more processors, cause the one or more processors to:
   determine an image acceptability inference for the image according to the machine learning model;
   determine a text acceptability inference for the text string according to the machine learning model;
   based on the image acceptability inference indicating that the image is unacceptable or the text acceptability inference indicating that the text string is unacceptable, determine that the proposed content pair does not satisfy the content acceptability threshold; and
   reject the proposed content pair.

20. The one or more computer-readable storage media of claim 19, further comprising instructions that, when executed on or across the one or more processors, cause the one or more processors to:
   determine the acceptability inference based on the image acceptability inference and the text acceptability inference, wherein a weighting factor is applied to the image acceptability inference or the text acceptability inference based on whether the image acceptability inference indicates that the image is unacceptable or the text acceptability inference indicating that the text string is unacceptable.

* * * * *